United States Patent
Ochiai

(10) Patent No.: US 10,585,965 B2
(45) Date of Patent: Mar. 10, 2020

(54) DETERMINATION DEVICE, DETERMINATION METHOD, AND PROGRAM

(71) Applicant: Rakuten, Inc., Tokyo (JP)

(72) Inventor: Yukiko Ochiai, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 297 days.

(21) Appl. No.: 14/901,081

(22) PCT Filed: Jun. 28, 2013

(86) PCT No.: PCT/JP2013/067942
§ 371 (c)(1),
(2) Date: Dec. 28, 2015

(87) PCT Pub. No.: WO2014/207941
PCT Pub. Date: Dec. 31, 2014

(65) Prior Publication Data
US 2016/0154893 A1 Jun. 2, 2016

(51) Int. Cl.
| | |
|---|---|
| *G06F 17/30* | (2006.01) |
| *G06F 7/00* | (2006.01) |
| *G06F 16/955* | (2019.01) |
| *G06Q 30/06* | (2012.01) |
| *G06F 17/22* | (2006.01) |
| *G06F 16/958* | (2019.01) |

(52) U.S. Cl.
CPC ........ *G06F 16/9566* (2019.01); *G06F 16/958* (2019.01); *G06F 17/2235* (2013.01); *G06Q 30/06* (2013.01); *G06Q 30/0603* (2013.01)

(58) Field of Classification Search
CPC .......... G06F 17/2235; G06F 17/30887; G06F 17/3089; G06F 16/9566; G06F 16/958
See application file for complete search history.

(56) References Cited

U.S. PATENT DOCUMENTS

| | | | | |
|---|---|---|---|---|
| 5,832,494 A | * | 11/1998 | Egger | .................. G06F 16/248 |
| | | | | 707/E17.089 |
| 6,601,066 B1 | * | 7/2003 | Davis-Hall | .......... G06F 17/3089 |
| 7,464,326 B2 | * | 12/2008 | Kawai | ................. G06F 17/3089 |
| | | | | 707/E17.116 |

(Continued)

FOREIGN PATENT DOCUMENTS

| | | |
|---|---|---|
| JP | H09-44499 A | 2/1997 |
| JP | 2004-139304 A | 5/2004 |

(Continued)

OTHER PUBLICATIONS

English Translation of International Search Report for PCT/JP2013/067942 dated Jul. 30, 2013.

*Primary Examiner* — Hasanul Mobin
(74) *Attorney, Agent, or Firm* — HEA Law PLLC

(57) ABSTRACT

A determination device includes an image obtaining unit for obtaining an image in a linked area associated with an URL, a linked-to page obtaining unit for obtaining, from storing means for storing content, a linked-to page specified by the URL associated with the linked area, and a character determination unit for determining correctness of association between the linked area and the URL based on the image obtained by the image obtaining unit and the linked-to page obtained by the linked-to page obtaining unit.

13 Claims, 15 Drawing Sheets

(56) References Cited

U.S. PATENT DOCUMENTS

| | | | |
|---|---|---|---|
| 9,305,227 B1* | 4/2016 | Nambiar | G06K 9/18 |
| 2003/0063105 A1* | 4/2003 | Agnew | G06T 11/60 |
| | | | 345/660 |
| 2003/0126136 A1* | 7/2003 | Omoigui | G06F 17/3089 |
| 2003/0200507 A1* | 10/2003 | Stern | G06F 17/211 |
| | | | 715/249 |
| 2004/0122848 A1* | 6/2004 | Toivonen | G06F 17/3089 |
| 2006/0007400 A1* | 1/2006 | Castaldi | G03B 21/26 |
| | | | 353/30 |
| 2006/0136565 A1* | 6/2006 | Rhoads | G06K 7/1417 |
| | | | 709/217 |
| 2007/0162942 A1* | 7/2007 | Hamynen | G06T 19/006 |
| | | | 725/105 |
| 2007/0250511 A1* | 10/2007 | Endler | G06F 16/951 |
| 2008/0172220 A1* | 7/2008 | Ohshima | G06F 17/27 |
| | | | 704/9 |
| 2008/0172738 A1* | 7/2008 | Bates | G06F 17/30887 |
| | | | 726/22 |
| 2008/0263143 A1* | 10/2008 | Takahashi | G06Q 30/02 |
| | | | 709/203 |
| 2009/0063431 A1* | 3/2009 | Erol | G06K 9/00463 |
| 2011/0016403 A1* | 1/2011 | Shibukawa | G06F 17/30899 |
| | | | 715/738 |
| 2011/0184793 A1* | 7/2011 | Bohannon | G06Q 10/107 |
| | | | 705/14.14 |
| 2013/0057542 A1* | 3/2013 | Takenaka | G06T 3/0031 |
| | | | 345/419 |
| 2014/0136508 A1* | 5/2014 | Lyngbaek | G06F 17/30887 |
| | | | 707/709 |
| 2016/0110319 A1* | 4/2016 | Bansal | G06F 17/214 |
| | | | 382/165 |

FOREIGN PATENT DOCUMENTS

| | | |
|---|---|---|
| JP | 2004-289357 A | 10/2004 |
| JP | 2007-188356 A | 7/2007 |

\* cited by examiner

FIG.2
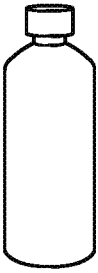
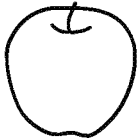
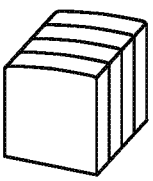

FIG.4

```
<html>
<h1>CATALOG</h1>
<img src="CATALOG.gif" usemap="rtmap">
<map name="rtmap">
<area href="SOYSAUCE.html" shape="rect" cords="x1,x2,x3,x4">
<area href="APPLE.html" shape="rect" cords="y1,y2,y3,y4">
<area href="BREAD.html" shape="rect" cords="z1,z2,z3,z4">
</map>
</html>
```

MAP DATA

FIG.9

```
<html>
<h1>CATALOG</h1>
<img src="CATALOG.gif" usemap="rtmap">
<map name="rtmap">
<area href="DRESSING .html" shape="rect" cords="x1,x2,x3,x4">
<area href="APPLE.html" shape="rect" cords="y1,y2,y3,y4">
<area href="BREAD.html" shape="rect" cords="z1,z2,z3,z4">
</map>
</html>
```

MAP DATA

FIG.10

INFORMATION ON SOY SAUCE A

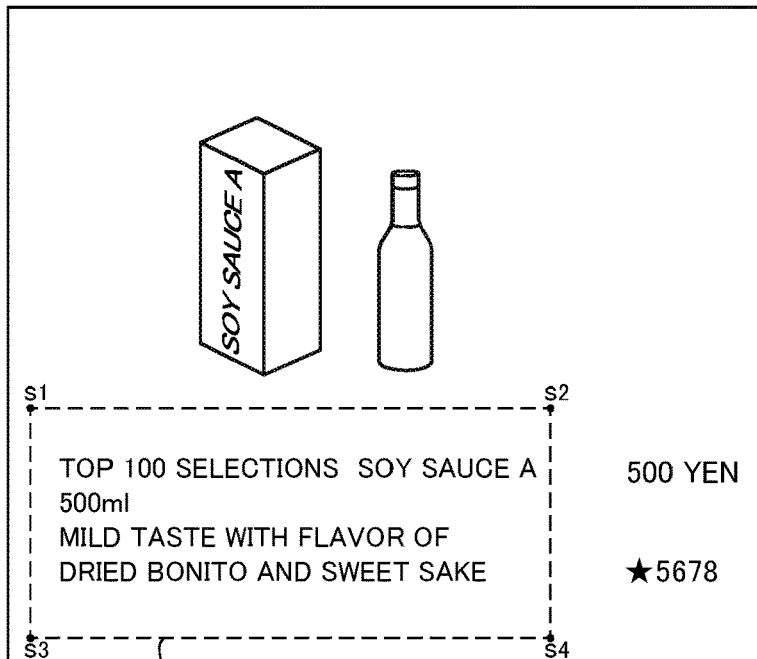

TOP 100 SELECTIONS  SOY SAUCE A
500ml
MILD TASTE WITH FLAVOR OF
DRIED BONITO AND SWEET SAKE

500 YEN

★5678

CLICKABLE AREA 4

PAGE OF SOY SAUCE A

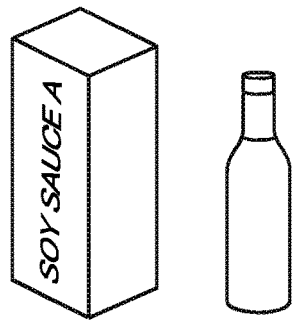

SOY SAUCE A
500ml     500 YEN

INGREDIENTS: SOY SAUCE, REDUCED STARCH SYRUP, SALT, DRIED BONITO, DRIED BONITO EXTRACT, SWEET SAKE

★5678

[ADD TO CART]

MILD TASTE SOY SAUCE, BLENDING TWICE-BREWED SOY SAUCE MADE IN A TIME CONSUMING TRADITIONAL WAY WITH HIGH-QUALITY DRIED BONITO AND SWEET SAKE. IT CAN BE USED IN STEW AND ONE-POT DISH.

FIG.11

```
<html>
<h1>CATALOG</h1>
<img src="CATALOG.gif" usemap="rtmap">
<map name="rtmap">
<area href="SOY SAUCE.html" shape="rect" cords="x1,x2,x3,x4">
<area href="APPLE.html" shape="rect" cords="y1,y2,y3,y4">
<area href="BREAD.html" shape="rect" cords="z1,z2,z3,z4">
<area href="SOY SAUCE A.html" shape="rect" cords="s1,s2,s3,s4">
</map>
</html>
```

MAP DATA

FIG.13

| ORDER | ITEM CODE |
|---|---|
| 1 | 1234 |
| 2 | 2345 |
| 3 | 3456 |
| ⋮ | ⋮ |

FIG.14

| ORDER | URL |
|---|---|
| 1 | SOY SAUCE.html |
| 2 | APPLE.html |
| 3 | BREAD.html |
| ⋮ | ⋮ |

FIG.15

```
<html>
<h1>CATALOG</h1>
<img src="CATALOG.gif" usemap="rtmap">
<map name="rtmap">
<area href="SOYSAUCE.html" shape="rect" cords="x1,x2,x3,x4">
     ↑
  REGISTER
</map>
</html>
```

DETERMINATION DEVICE, DETERMINATION METHOD, AND PROGRAM

CROSS REFERENCE TO RELATED APPLICATIONS

This application is a National Stage of International Application No. PCT/JP2013/067942 filed on Jun. 28, 2013. The contents of the above documents are incorporated herein by reference in their entirety.

TECHNICAL FIELD

The present invention relates to a determination device, a determination method, and a program.

BACKGROUND ART

Recently, systems are becoming widespread in which, when a user accesses a web site and selects a text or a photograph on a web page, content such as a URL (Uniform Resource Locator) of a web page linked to the text or the photograph is displayed. For example, items are listed on a web catalog used in a web shopping, and when a user selects a code or a photograph of a desired item, an item page (content) with information of the selected item is displayed. In such a system, item codes or photographs are set in clickable areas, and each clickable area is linked to a URL of an item page.

Patent Literature 1 describes a technology for adding link information to a text or a photograph when converting data for generating printed materials, such as magazines and catalogs, into PDF data.

CITATION LIST

Patent Document

Patent Literature 1: JP2004-289357A

SUMMARY OF INVENTION

Technical Problem

In the above system, a site operator manually associates a clickable area with a URL, and thus an error in the association could occur. In addition, the site operator needs to manually test whether the association is correct, which requires a lot of work.

One or more embodiments of the present invention have been conceived in view of the above, and an object thereof is to provide a determination device, a determination method, and a program for determining correctness of association between information included in a web page and a URL of linked information.

Solution to Problem

In order to solve the above described problems, a determination device according to the present invention includes information obtaining means for obtaining link source information that is available in a linked area or around the linked area, the linked area being associated with an URI, content obtaining means for obtaining, from storing means for storing content, content specified by the URI associated with the linked area, and determination means for determining correctness of association between the linked area and the URI based on the link source information obtained by the information obtaining means and the content obtained by the content obtaining means.

The determination device may further include character recognition means for recognizing the link source information as characters, the link source information being obtained by the information obtaining means. The determination means may determine the correctness of the association between the linked area and the URI based on the characters recognized by the character recognition means and the content obtained by the content obtaining means.

The determination means may determine the correctness of the association based on whether the characters recognized by the character recognition means are included in the content obtained by the content obtaining means.

The determination means may determine the correctness of the association based on whether the content obtained by the content obtaining means includes a predetermined ratio or more of number of the characters recognized by the character recognition means.

The determination device may further include coordinates obtaining means for obtaining coordinates of the linked area in a page. The information obtaining means may obtain the link source information based on the coordinates of the linked area obtained by the coordinates obtaining means.

The determination device may further include messaging means for sending an error message when the association is incorrect.

The determination device may further include generating means for setting the linked area in the page, obtaining, from a table in which the URI is registered in advance, the URI corresponding to the set linked area, and associating the linked area with the URI.

The URI may be registered in the table in accordance with an arrangement order of the linked area.

A determination method includes the step of obtaining link source information that is available in a linked area or around the linked area, the linked area being associated with an URI, obtaining, from storing means for storing content, content specified by the URI associated with the linked area, and determining correctness of association between the linked area and the URI based on the link source information obtained in the information obtaining step and the content obtained in the content obtaining step.

A program according to the present invention for causing a computer to function as information obtaining means for obtaining link source information that is available in a linked area or around the linked area, the linked area being associated with an URI, content obtaining means for obtaining, from storing means for storing content, content specified by the URI associated with the linked area, and determination means for determining correctness of association between the linked area and the URI based on the link source information obtained by the information obtaining means and the content obtained by the content obtaining means. The program may be stored in a computer-readable information storage medium, such as a CD-ROM and a DVD-ROM.

Advantageous Effects of Invention

According to the present invention, the correctness of the association between the linked area and the URL is determined based on the characters in the linked area and content corresponding to the URL associated with the linked area. As such, it is possible to easily determine the correctness of the association between information included in the web page and the URL of the linked information.

BRIEF DESCRIPTION OF DRAWINGS

FIG. 2 is a diagram illustrating an example of an item page;

FIG. 4 is a diagram illustrating an example of a HTML file;

FIG. 9 is a diagram illustrating an example of a HTML file;

FIG. 10 is a diagram illustrating an example of a web catalog and an item page;

FIG. 11 is a diagram illustrating an example of a HTML file;

FIG. 13 is a diagram illustrating a table of a list of item codes;

FIG. 14 is a diagram illustrating a table of a list of URLs;

FIG. 15 is a diagram illustrating of an example of a HTML file; and

DESCRIPTION OF EMBODIMENTS

An embodiment of the present invention will be described below in detail with reference to the accompanying drawings. In the following, a web catalog used in a web site for Internet shopping is taken as an example.

Figure 1:
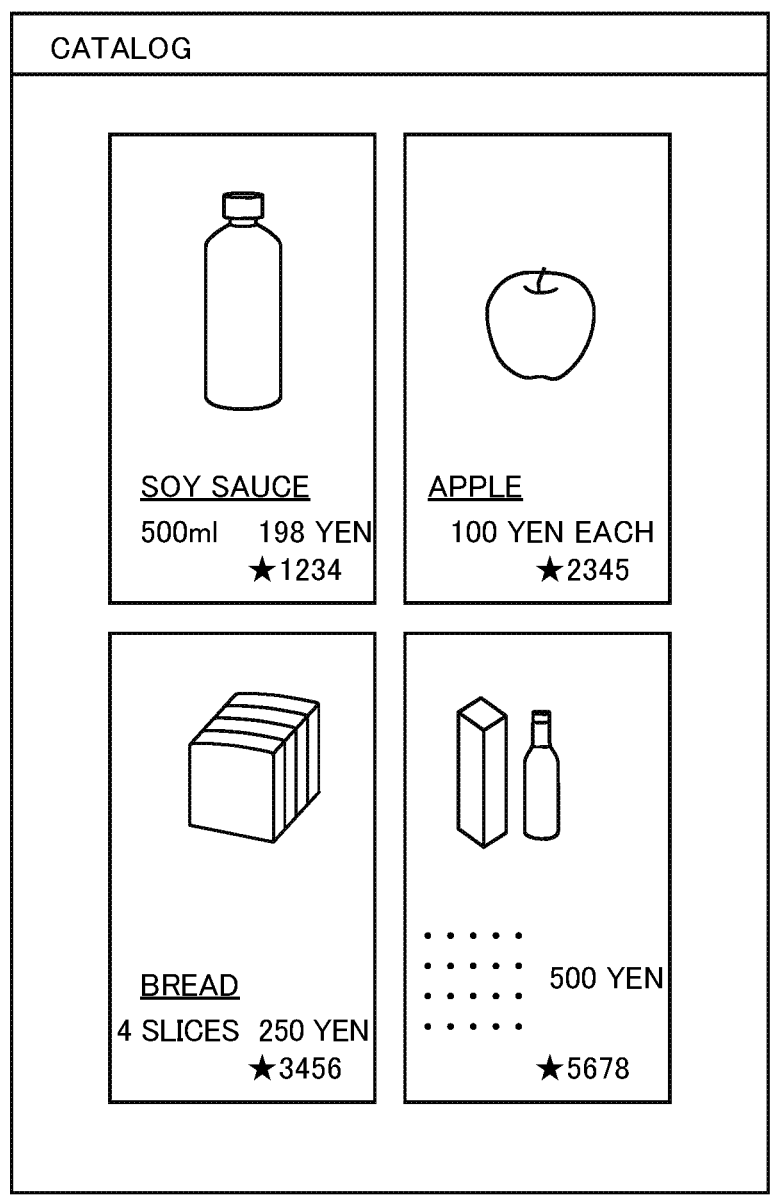
FIG. 1 is a diagram illustrating an example of a web catalog.

FIG. 1 illustrates an example of a web catalog. When a user accesses a web site of Internet shopping, a web catalog (web page) is displayed on a user terminal. The web catalog includes a list of information of items, such as, soy sauce, apple, and bread. Each item has an item code, a photograph, and a text respectively associated with a URL of an item page (content) in which detailed information of the item is described. For example, an item name, an item code, and a photograph of the item "soy sauce" are associated with a URL of the item page of "soy sauce" shown in FIG. 2. When the user selects the photograph of the item "soy sauce" in the web catalog (see FIG. 1), for example, the item page (see FIG. 2) of "soy sauce" is displayed on the user terminal. The item page of "soy sauce" includes detailed information such as an item name, a photograph, an item code, a price, volume, ingredients, and a manufacturer. Similarly, the items "apple" and "bread" in the web catalog are respectively associated with the item pages of "apple" and "bread" shown in FIG. 2. When the user wishes to purchase an item, the user selects a purchasing button displayed on the item page. The determination device according to this embodiment enables to easily determine the correctness of association between an item on a web catalog (see FIG. 1) and a URL of an item page (see FIG. 2) displaying information of the item in the above described manner of the Internet shopping, for example. The above determination processing is executed by the operation of the site operator.

Figure 3:
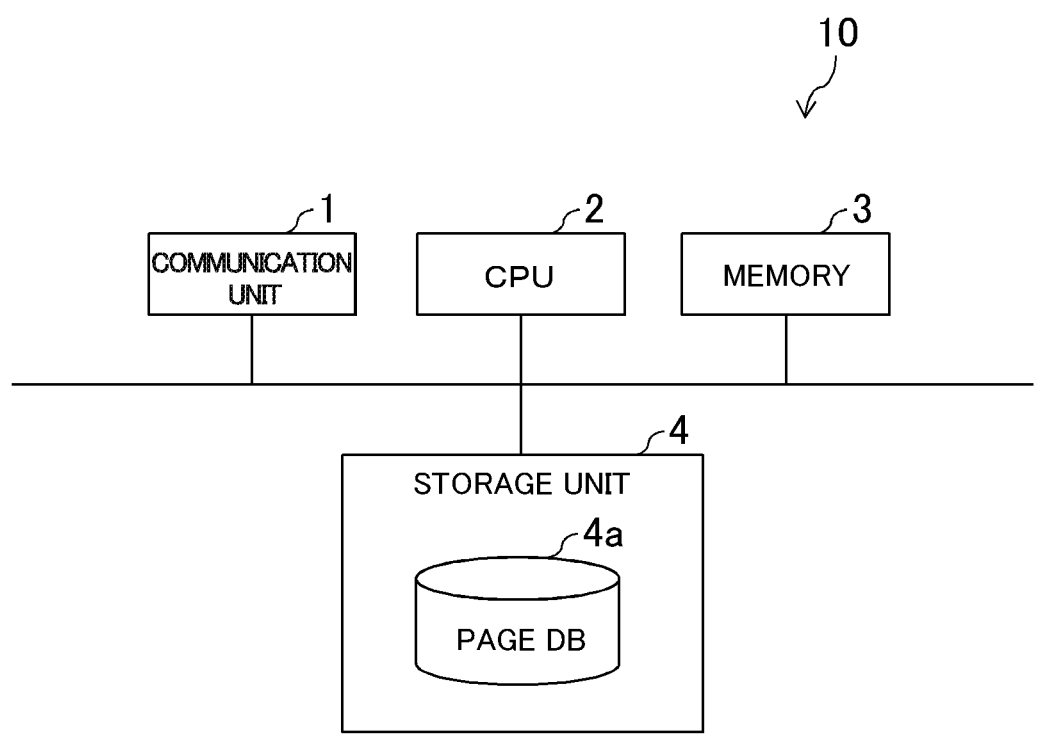
FIG. 3 is a diagram illustrating a hardware configuration of a determination device.

FIG. 3 is a hardware configuration of the determination device according to this embodiment. As shown in FIG. 3, the determination device 10 includes a communication unit 1, a CPU 2, a memory 3, and a storage unit 4. The hardware elements of the determination device 10 are connected one another so that data is transmitted/received via a bus. The communication unit 1 sends and receives information to and from a user terminal through, for example, the Internet. The CPU 2 controls each unit of the device and executes various types of information processing. The memory 3 stores programs and data. Further, the memory 3 also has a work area of the CPU 2.

The storage unit 4 includes a page DB4a. The page DB4a stores HTML files corresponding to web catalogs. The HTML files are generated by the site operator. Specifically, the site operator obtains image data (catalog data) in PDF format, which is original data of a web catalog, from a printing company, for example, and generates a HTML file including clickable areas and corresponding linked URLs based on the obtained catalog data. The HTML file and the image file specified in the HTML file are displayed on a web browser of the user terminal, and the web catalog shown in FIG. 1 is thereby displayed. In this regard, the clickable areas and linked URLs may be specified in, for example, a JavaScript (registered trademark) file different from a HTML file. The linked item page associated with the item on the web catalog is generated by the site operator, and uploaded to the web server (storage means). The storage unit 4 may be connected to the communication unit 1, the CPU 2, and the memory 3 through the Internet.

Figure 5:
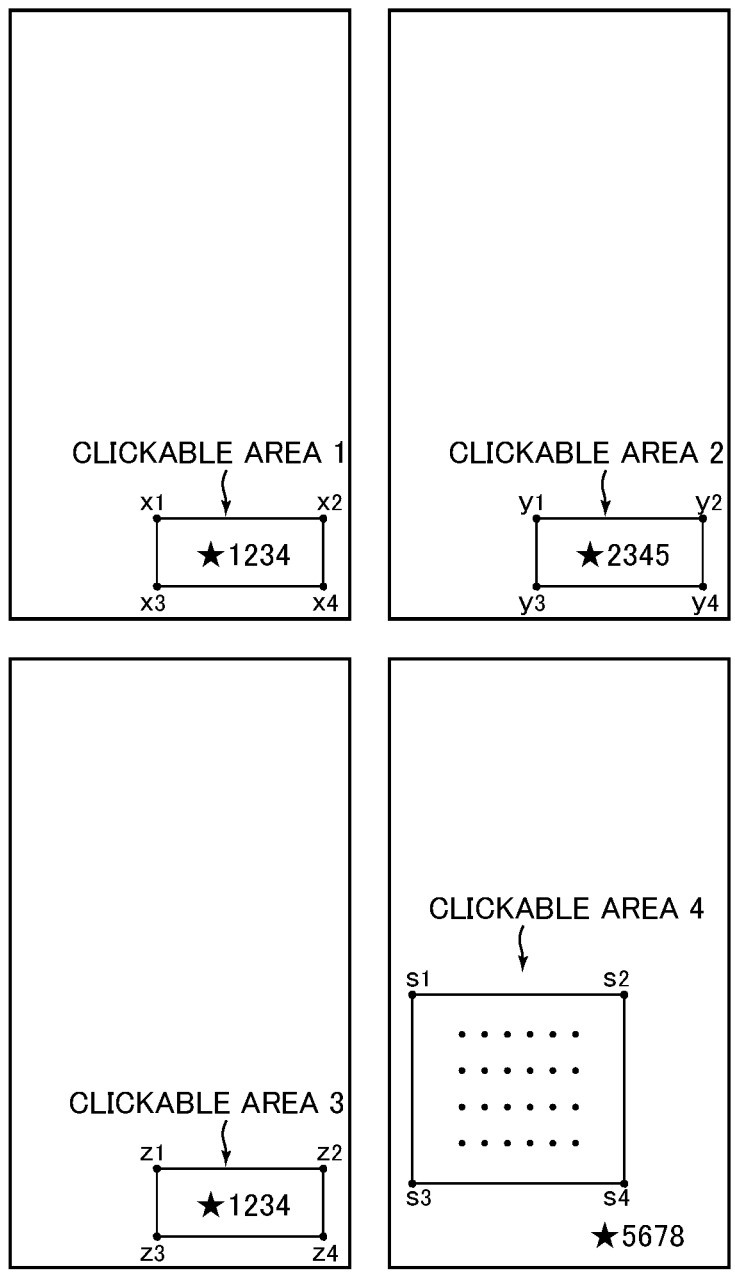
FIG. 5 is a diagram illustrating an example of clickable areas.

FIG. 4 illustrates an example of a HTML file corresponding to the web catalog shown in FIG. 1. FIG. 5 illustrates an example of clickable areas (linked areas) on the web catalog shown in FIG. 1. The HTML file includes elements (map data) for setting clickable areas and associated URLs. Here, a URL "http://aaa.co.jp/soy sauce.html" of an item page of "soy sauce" is set in a rectangular linked area at the position of coordinates (x1,x2,x3,x4), a URL "http://aaa.co.jp/apple.html" of an item page of "apple" is set in a rectangular linked area at a position of coordinates (y1,y2,y3,y4), and a URL "http://aaa.co.jp/bread.html" of an item page of "bread" is set in a rectangular linked area at the position of coordinates (z1,z2,z3,z4). The linked areas respectively correspond to the clickable areas. As shown in FIG. 5, each clickable area corresponds to an item code column, and the linked areas of "soy sauce", "apple", and "bread" are indicated as clickable area 1, clickable area 2, and clickable area 3, respectively. A clickable area 4 will be described below.

Figure 6:
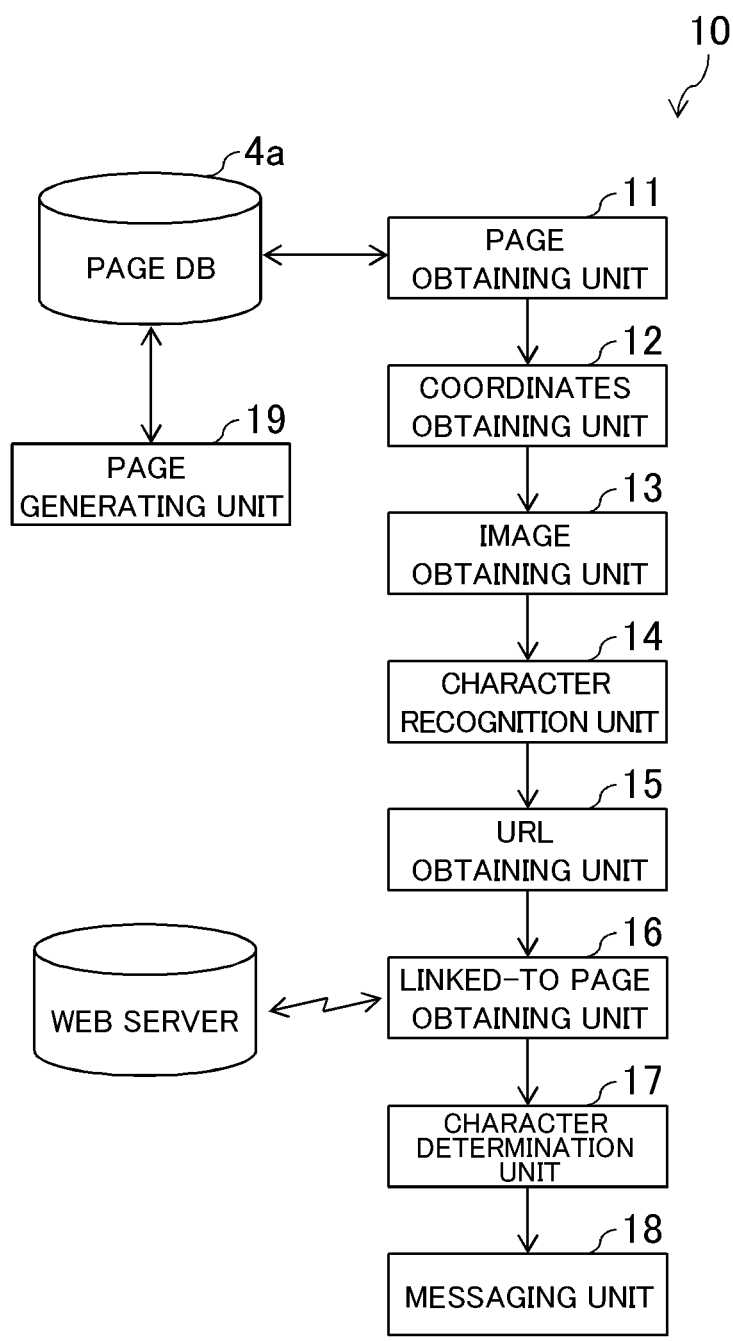
FIG. 6 is a functional block diagram of the determination device.

FIG. 6 is a functional block diagram of the determination device 10. As shown in FIG. 6, the determination device 10 includes a page obtaining unit 11, a coordinates obtaining unit 12 (coordinates obtaining means), an image obtaining unit 13 (information obtaining means), a character recognition unit 14 (character recognition means), a URL obtaining unit 15, a linked-to page obtaining unit 16 (content obtaining means), a character determination unit 17 (determination means), a messaging unit 18 (messaging means), and a page generating unit 19 (generating means). These elements are implemented when the CPU 2 executes a program stored in the memory 3. The program may be installed to the determination device 10 from a computer-readable information storage medium such as a CD-ROM, a DVD-ROM, and a memory card, or downloaded from a communication network such as the Internet.

The page obtaining unit 11 obtains a HTML file corresponding to the web catalog from the page DB4a. The page obtaining unit 11 obtains a HTML file as shown in FIG. 4, for example.

The coordinates obtaining unit 12 obtains coordinates of clickable areas from the HTML file obtained by the page obtaining unit 11. The coordinates obtaining unit 12 obtains coordinates (x1,x2,x3,x4) of the clickable area 1, coordinates (y1,y2,y3,y4) of the clickable area 2, or coordinates (z1,z2,z3,z4) of the clickable area 3 from map data of the HTML file shown in FIG. 4, for example.

In the image data (catalog data) of the web catalog shown in FIG. 1, the image obtaining unit 13 obtains an image (area image) (link source information) in the clickable area corresponding to the coordinates obtained by the coordinates obtaining unit 12. The image obtaining unit 13 obtains, for example, an area image "★1234" of the clickable area 1 corresponding to the coordinates (x1,x2,x3,x4), an area image "★2345" of the clickable area 2 corresponding to the coordinates (y1,y2,y3,y4), or an area image "★3456" of the clickable area 3 corresponding to the coordinates (z1,z2,z3,z4). When the catalog data is marked with a predetermined symbol ("★" (star symbol) in this case), the image obtaining unit 13 may recognize an image of the catalog data and obtain a predetermined area including the symbol as an area image. The image obtaining unit 13 obtains a text display as an area image when the clickable area is a text display column (clickable area 4 in FIG. 5), and obtains a photograph as an area image when the clickable area is a photograph column. The image obtaining unit 13 may obtain an image around the clickable area instead of an image in the clickable area. For example, the image obtaining unit 13 may obtain an area positioned in the area displaying the corresponding item as an area image of the clickable area 1 shown in FIG. 5. If a size of the area displaying the corresponding item and a position of the clickable area in the displaying area are known, the area in the displaying area can be specified.

The character recognition unit 14 performs character recognition in the area image obtained by the image obtaining unit 13. The character recognition unit 14 performs character recognition using an optical character recognition (OCR) method, for example. The character recognition unit 14 performs character recognition on the item code when the clickable area is an item code column, and performs character recognition on the text when the clickable area is a text display column. In a case a character code can be obtained, it is not necessary to perform character recognition processing.

The URL obtaining unit 15 obtains, from the HTML file obtained by the page obtaining unit 11, a URL of the item page corresponding to the coordinates obtained by the coordinates obtaining unit 12. For example, the URL obtaining unit 15 obtains, from map data of the HTML file shown in FIG. 4, the URL "http://aaa.co.jp/soy sauce.html" corresponding to the coordinates (x1,x2,x3,x4) of the clickable area 1, the URL "http://aaa.co.jp/apple.html" corresponding to the coordinates (y1,y2,y3,y4) of the clickable area 2, or the URL "http://aaa.co.jp/bread.html" corresponding to the coordinates (z1,z2,z3,z4) of the clickable area 3.

The linked-to page obtaining unit 16 obtains, from the web server, an item page of the URL obtained by the URL obtaining unit 15. For example, the linked-to page obtaining unit 16 obtains, from the web server, an item page of the URL "http://aaa.co.jp/soy sauce.html", an item page of the URL "http://aaa.co.jp/apple.html", or an item page of the URL "http://aaa.co.jp/bread.html", each shown in FIG. 2.

The character determination unit 17 determines whether the item page obtained by the linked-to page obtaining unit 16 includes the character recognized by the character recognition unit 14. The character determination unit 17 may determine whether the item page includes a character that matches the recognized character, or may determine, when there are multiple number of recognized characters, whether the number of recognized characters included in the item page is equal to or more than a predetermined ratio of number of characters. When the clickable area includes a photograph column, the character determination unit 17 may further calculate similarity between the area image obtained by the image obtaining unit 13 and the photograph image on the item page, and perform the determination based on the similarity. In this case, the character determination unit 17 functions as an image processing determination unit, and calculates the similarity by, for example, extracting and comparing feature points of the image.

The messaging unit 18 sends a message based on the determination result of the character determination unit 17. Specifically, when the recognized character is not included in the item page, the association of the link is incorrect, and thus the messaging unit 18 sends an error message. When the recognized character is included in the item page, the messaging unit 18 may send a message to inform that the association of the link is correct.

The page generating unit 19 performs processing for associating coordinates of clickable areas with URLs of item pages and generating HTML files (see FIG. 4). The HTML files generated by the page generating unit 19 are stored in the page DB4a.

[Embodiment 1]

Figure 7:
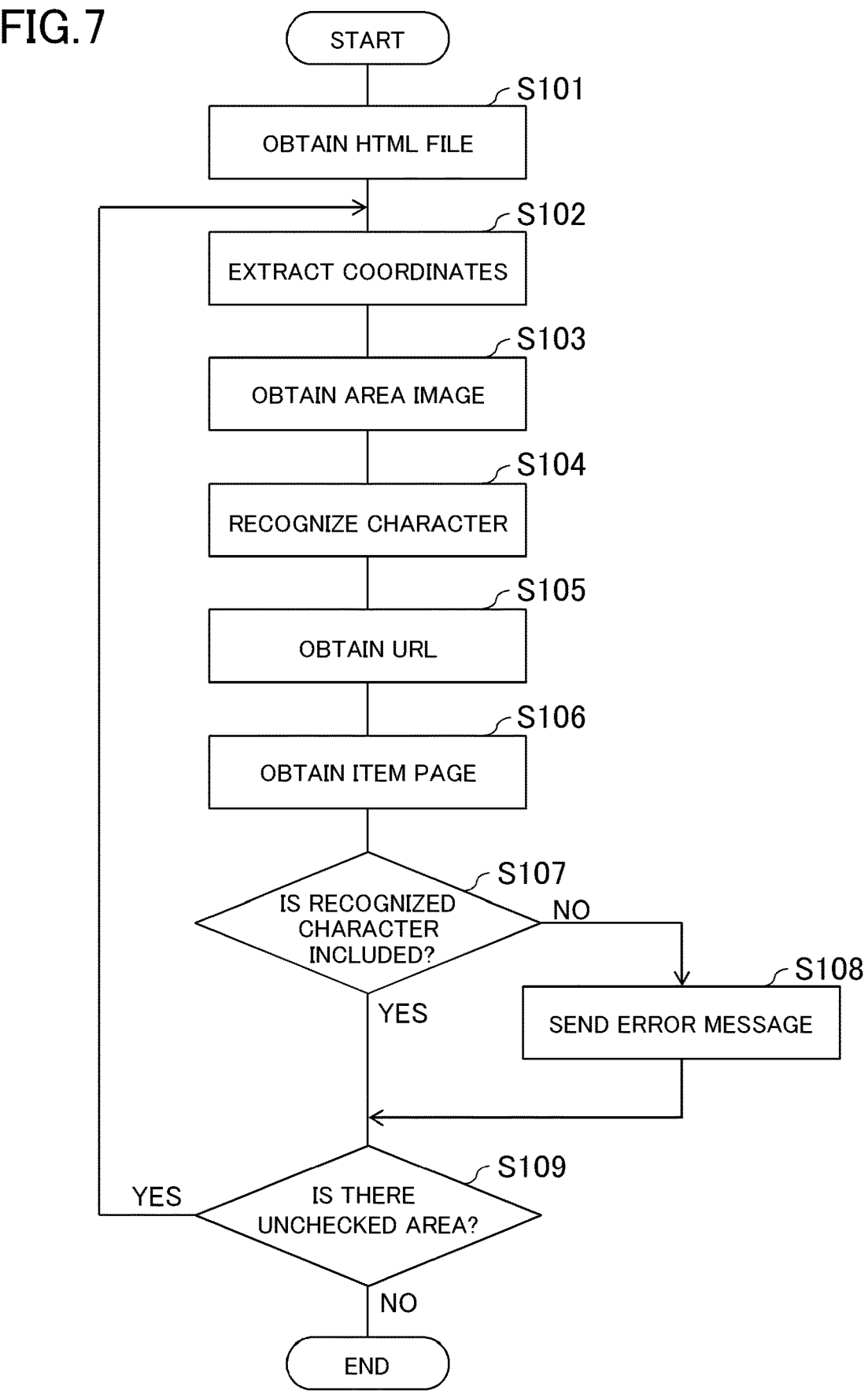
FIG. 7 is an operational flow chart of the determination device according to the embodiment 1.

FIG. 7 is an operational flow chart of the determination device 10 according to the embodiment 1. Here, the embodiment 1 is described by example of the web catalog shown in FIG. 1 and the item pages shown in FIG. 2.

Assuming that the site operator generates a HTML file (see FIG. 4) corresponding to the web catalog shown in FIG. 1, and the generated HTML file is stored in the page DB4a. In addition, assuming that multiple item pages, as shown in FIG. 2, generated by the site operator are uploaded to the web server. Further, as shown in FIG. 5, assuming that item code columns of items are set in the clickable areas 1 to 3 in the web catalog shown in FIG. 1. The site operator generates a HTML file based on a list in which an item code of each item and a URL of the item page are associated in advance.

When a HTML file corresponding to the web catalog is generated, the site operator selects a checking mode for checking the correctness of association of a link in the determination device 10. This allows the following checking processing to be executed.

The page obtaining unit 11 obtains the HTML file shown in FIG. 4 from the page DB4a (S101).

Subsequently, the coordinates obtaining unit 12 obtains coordinates (x1,x2,x3,x4) of the clickable area 1 (see FIG. 5) from the first data of the map data in the HTML file obtained in S101 (S102).

The image obtaining unit 13 then obtains, in the image data (catalog data) of the web catalog shown in FIG. 1, an image (area image 1) of the clickable area 1 corresponding to the coordinates (x1,x2,x3,x4) obtained in S102 (S103). Here, "★1234" in the item code column is obtained as an area image 1.

Subsequently, the character recognition unit 14 performs character recognition in the area image 1 obtained in S103 (S104). Here, "★1234" in the area image 1 is recognizes as a character.

The URL obtaining unit 15 then obtains, from the HTML file obtained in S101, a URL "http://aaa.co.jp/soy sauce.html" corresponding to the coordinates (x1,x2,x3,x4) obtained in S102 (S105).

The linked-to page obtaining unit 16 obtains, from the web server, an item page (see FIG. 2) of the URL "http://aaa.co.jp/soy sauce.html" obtained in S105 (S106).

Subsequently, the character determination unit 17 determines whether the item page of "soy sauce" obtained in S106 includes the character "★1234" recognized in S104 (S107). In the example shown in FIG. 2, since the item page of "soy sauce" includes the item code "★1234", the association of the link is regarded as correct, and the processing proceeds to S109.

Figure 8:
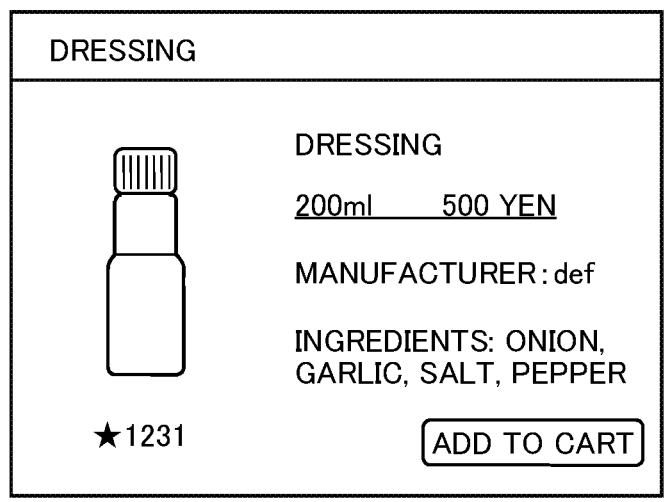
FIG. 8 is a diagram illustrating an example of an item page.

On the other hand, When the item page obtained in S106 has content shown in FIG. 8, for example, the item code "★1234" on the web catalog does not match the item code "★1231" on the item page, the association of the link is regarded as incorrect, and the processing proceeds to S108. FIG. 9 illustrates a HTML file corresponding to the item page shown in FIG. 8. As shown in FIG. 9, an incorrect URL "http://aaa.co.jp/dressing.html" is set in the first data of the map data.

After the messaging unit 18 sends an error message in S108, the processing proceeds to S109. This enables the site operator to recognize that the association of the link is incorrect in the HTML file.

In S109, it is determined whether there is a clickable area (unchecked area) where the above check processing has not been performed. Specifically, the determining processing is performed referring to the map data of the HTML file obtained in S101. This enables to perform the check processing for all of the clickable areas.

When there is an unchecked area, the processing returns to S102, and the coordinates obtaining unit 12 obtains coordinates of the subsequent clickable area from the map data of the HTML file obtained in S101. Here, the coordinates obtaining unit 12 obtains the coordinates (b1,b2,b3,b4) of the clickable area 2 (S102). Thereafter, the processing similar to the above processing is performed. When there is no unchecked area, that is, the above processing has been performed for all of the clickable areas, the determination device 10 finishes the check processing.

As described above, according to the determination device 10 of this embodiment, the correctness of the association between item information of the web catalog and the URL of the linked item page of the item information is easily determined. Even if the association between the clickable area and the URL is correct, the item page (content) specified by the URL may be incorrect and fail to correspond to information of the clickable area. In this case, it is also possible to detect the error.

[Embodiment 2]

In the embodiment 1, clickable areas are set in item code columns. However, the present invention is not limited to this. In the embodiment 2, clickable areas are set in text display columns (clickable area 4 in FIG. 5). In the following, differences between the embodiment 1 and the embodiment 2 are mainly explained. FIG. 10 illustrates information of an item "soy sauce A" having item code "★5678" on the web catalog shown in FIG. 1 and an item page of the item "soy sauce A".

The coordinates obtaining unit 12 obtains coordinates (s1,s2,s3,s4) (see FIG. 5) of the clickable area 4 from the map data of the HTML file (see FIG. 11) obtained by the page obtaining unit 11. The check processing described in the embodiment 1 may be performed for the clickable areas 1 to 3.

The image obtaining unit 13 obtains, in catalog data (image data) of the web catalog shown in FIG. 10, an image (area image 4) of the clickable area 4 corresponding to the coordinates (s1,s2,s3,s4) obtained by the coordinates obtaining unit 12. Here, a text display column is obtained as an area image 4.

The character recognition unit 14 performs character recognition for the area image 4 obtained by the image obtaining unit 13. Here, the text in the area image 4 is recognized as a character (word). Specifically, the character recognition unit 14 recognizes, for example, "soy sauce", "top 100 selections", "soy sauce A", "500 ml", "dried bonito" "sweet sake", "mild", and "taste" by morphological analysis.

The URL obtaining unit 15 obtains a URL "http://aaa.co.jp/soy sauce A.html", which corresponds to the coordinates (s1,s2,s3,s4) obtained by the coordinates obtaining unit 12, from the HTML file (see FIG. 11) obtained by the page obtaining unit 11.

The linked-to page obtaining unit 16 obtains, from the web server, an item page (see FIG. 10) of the URL "http://aaa.co.jp/soy sauce A.html" obtained by the URL obtaining unit 15.

The character determination unit 17 determines whether the item page of "soy sauce A" obtained by the linked-to page obtaining unit 16 includes a predetermined ratio or more of number of characters recognized by the character recognition unit 14. For example, it is determined whether the item page of "soy sauce A" includes 80% or more of the 8 words, i.e., 7 words or more. In the example of FIG. 10, the item page of "soy sauce A" does not include "top 100 selections", but includes other 7 words. As such, it is determined that the association of the link is correct.

As described above, when a clickable area is set in a text display column, the correctness of the association of the link can be determined by comparing the number of characters.

A photograph column of an item may be added as a clickable area. In this case, the determination device 10 may be configured to calculate similarity between a photograph of the item on the web catalog and a photograph on the item page by performing image recognition, and determine the correctness of the association of the link based on the similarity. In this regard, the determining processing using image recognition may be performed when it is determined that the association of the link is incorrect in the determining processing using character recognition ("NO" in S107).

As described above, the determination device 10 can determine correctness of association of a link in various clickable areas. A clickable area may be set in all of an item code column, a text display column, and a photograph column, for one item. In this case, among the above determining processing, corresponding determining processing may be performed for each clickable area. In the above embodiment, a web catalog generated using a PDF is discussed, although the present invention is applied to all of the web pages each including a link.

[Generation of html File]

Figure 12:
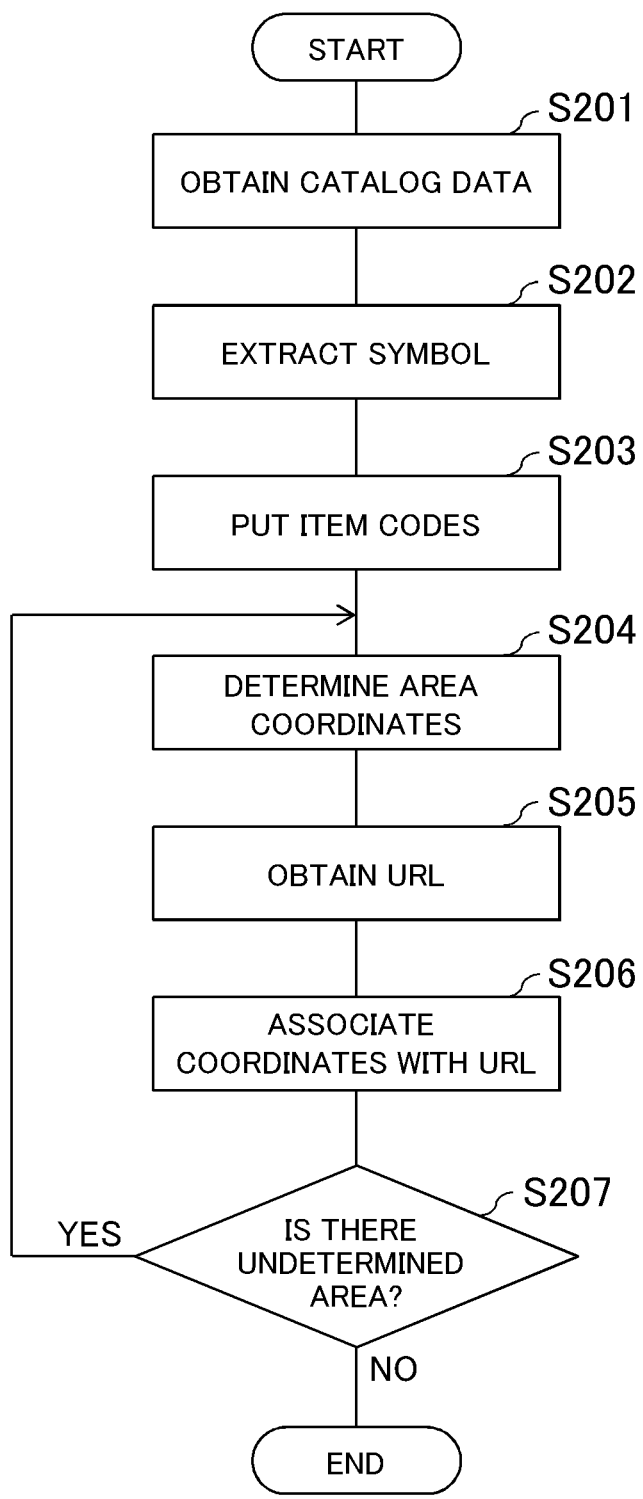
FIG. 12 is an operational flow chart of a page generating unit.

The page generating unit 19 will be discussed in detail. FIG. 12 is an operational flow chart of the page generating unit 19.

The page generating unit 19 sets clickable areas and corresponding linked-to URLs based on original image data in PDF format for the web catalog, and performs processing for generating HTML files. In other words, the page generating unit 19 automatically sets clickable areas, and associates the clickable areas with linked-to URLs. Here, image data (catalog data) of the web catalog in FIG. 1 is taken as an example.

Upon obtaining the catalog data (S201), the page generating unit 19 extracts, from the catalog data, a symbol (keyword) for specifying a clickable area (S202). For example, "★" is added as a symbol.

Subsequently, the page generating unit 19 puts item codes attached to the symbols in arrangement order based on coordinates of the symbols (S203). FIG. 13 shows a table of item codes listed in the arrangement order.

The page generating unit 19 determines coordinates (x1, x2,x3,x4) of the first clickable area 1 based on the coordinates of the symbol of the first item code (S204).

The page generating unit 19 then obtains the first URL "http://aaa.co.jp/soy sauce.html" from the table (see FIG. 14) of the list of URLs generated by the site operator (S205).

Subsequently, the page generating unit 19 associates the coordinates (x1,x2,x3,x4) of the first clickable area 1 determined in S204 with the first URL "http://aaa.co.jp/soy sauce.html" obtained in S205, and register them in a HTML file (see FIG. 15) (S206).

Returning to S204, the page generating unit 19 determines coordinates (y1,y2,y3,y4) of the second clickable area 2 based on the coordinates of the symbol of the second item code. In the following, similar processing as described above is performed, and the coordinates (y1,y2,y3,y4) of the second clickable area 2 are associated with the second URL "http://aaa.co.jp/apple.html" and registered in the HTML file.

The page generating unit 19 repeats the above processing for all of the clickable areas, and registers coordinates of respective clickable areas in association with URLs in the HTML file. In this way, the HTML file shown in FIG. 4 is generated. The page generating unit 19 is configured to automatically associate coordinates of a clickable area with a URL, thereby reducing errors in association of a link.

[Obtaining Item Page]

In the HTML file shown in FIG. 4, an item page associated with a clickable area is specified by a URL. However, an item page cannot be specified by a URL before the item page is uploaded to the web server. As such, the linked-to page obtaining unit 16 converts the URL obtained by the URL obtaining unit 15 into a local address, and obtains an item page based on the converted address.

Figure 16:
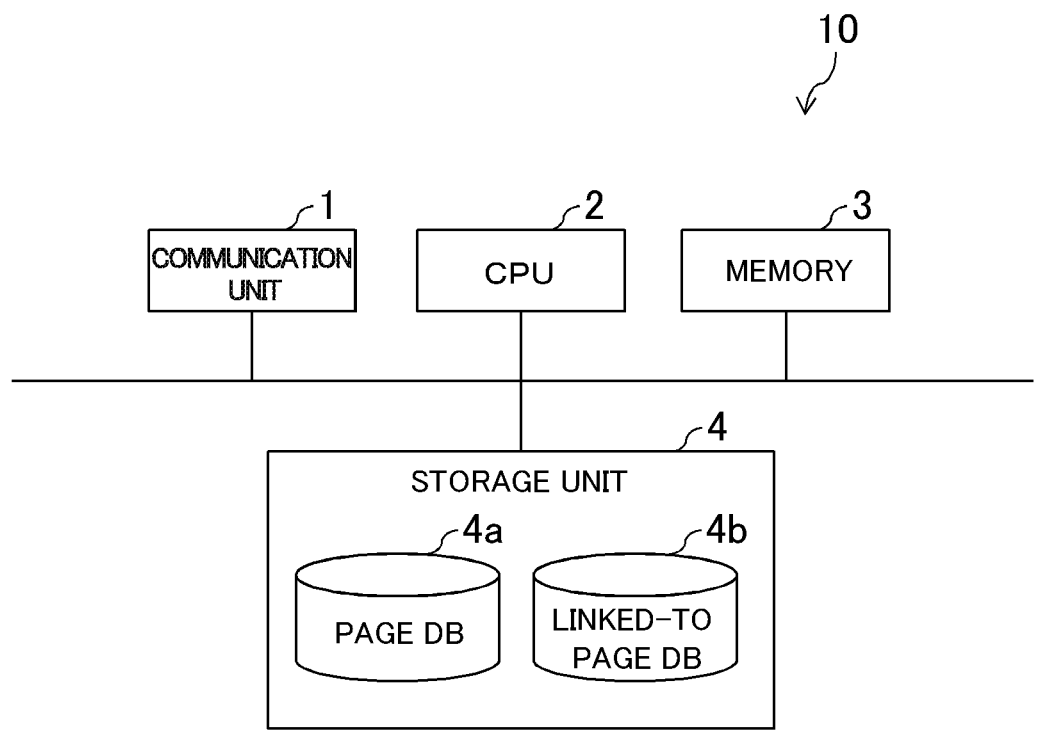
FIG. 16 is a diagram illustrating a hardware configuration of the determination device.

Specifically, the linked-to page obtaining unit 16 converts the URL into "local storage pass+file name" when a plurality of item pages are stored in the local storage. For example, the linked-to page obtaining unit 16 converts "URL:http://aaa.co.jp/soy sauce.html" into "C:¥temp¥soy sauce.html". As shown in FIG. 16, for example, a linked-to page DB4b in the storage unit 4 of the determination device 10 can be used as a local storage. This enables the linked-to page obtaining unit 16 to surely obtain item pages.

In the above embodiment, the web catalog having only 1 page is discussed. When a web catalog includes a lot of pages, it also includes a lot of link portions. By applying the present invention, it is possible to efficiently associate links and determine correctness of the association of links. In the above embodiment, the case is explained in which the present invention is applied to web pages, although the present invention is not limited to web pages. For example, the present invention may be applied to a screen (page) that is displayed on an application of a smartphone or a tablet and includes a link. In this case, a linked-to page is specified by an URI (Uniform Resource Identifier).

The invention claimed is:

1. A determination device, including a processor, comprising:
    an information obtaining unit, within the processor, for obtaining link source information that is available outside a linked area of an image file, the linked area being associated with an URI;
    a content obtaining unit, within the processor, for obtaining, from storing unit for storing content, content specified by the URI associated with the linked area;
    a determination unit, within the processor, for determining correctness of association between the linked area and the URI based on the link source information obtained by the information obtaining unit and the content obtained by the content obtaining unit;
    an image obtaining unit, within the processor, for obtaining an area image of an area outside the linked area of the image file;
        wherein the link source information includes recognizable characters visible in the area image;
    a character recognition unit, within the processor, for recognizing the link source information as characters from the area image; and
    a coordinates obtaining unit, within the processor, for obtaining coordinates of the linked area within an image of the image file, the linked area being a part of the image of the image file and specified by the coordinates,
    wherein the determination unit determines the correctness of the association between the linked area and the URI based on the characters recognized by the character recognition unit and the content obtained by the content obtaining unit, and
    wherein the image obtaining unit obtains the area image from the image of the image file based on the coordinates obtained by the coordinates obtaining unit,
    wherein the determination unit determines the correctness of the association based on whether the characters recognized by the character recognition unit are included in the content obtained by the content obtaining unit.

2. The determination device according to claim 1, further comprising:
    a messaging unit, within the processor, for sending an error message when the association is incorrect.

3. The determination device according to claim 1, further comprising:
    a generating unit, within the processor, for setting the linked area in the page, obtaining, from a table in which the URI is registered in advance, the URI corresponding to the set linked area, and associating the linked area with the URI.

4. The determination device according to claim 3,
    wherein the URI is registered in the table in accordance with an arrangement order of the linked area.

5. A determination method to be executed by a computer, comprising:
    obtaining link source information that is available outside a linked area of an image file, the linked area being associated with an URI;
    obtaining, from storing unit for storing content, content specified by the URI associated with the linked area;

determining correctness of association between the linked area and the URI based on the obtained link source information and the obtained content;
obtaining an area image of an area outside the linked area of the image file;
wherein the link source information includes recognizable characters visible in the area image;
recognizing the link source information as characters from the area image; and
obtaining coordinates of the linked area within an image of the image file, the linked area being a part of the image of the image file and specified by the coordinates,
wherein the correctness of the association between the linked area and the URI being determined based on the recognized characters and the obtained content, and
wherein the area image being obtained from the image of the image file based on the obtained coordinates,
wherein the determination of correctness of the association is based on whether the recognized characters are included in the obtained content.

6. A non-transitory computer-readable storage medium having stored thereon a program for causing a computer to:
obtain link source information that is available outside a linked area of an image file, the linked area being associated with an URI;
obtain, from storing unit for storing content, content specified by the URI associated with the linked area;
determine correctness of association between the linked area and the URI based on the obtained link source information and the obtained content;
obtain an area image of an area outside the linked area of the image file;
wherein the link source information includes recognizable characters visible in the area image;
recognize the link source information as characters from the area image; and
obtain coordinates of the linked area within an image of the image file, the linked area being a part of the image of the image file and specified by the coordinates,
wherein the correctness of the association between the linked area and the URI being determined based on the recognized characters and the obtained content, and
wherein the area image being obtained from the image of the image file based on the obtained coordinates,
wherein the determination of correctness of the association is based on whether the recognized characters are included in the obtained content.

7. The determination device according to claim 1,
wherein the character recognition unit recognizes the link source information as characters from the area image using an OCR method.

8. The determination device according to claim 1,
wherein the image of the image file includes a plurality of the linked areas.

9. A determination device, including a processor, comprising:
an information obtaining unit, within the processor, for obtaining first link source information that is available outside a first linked area of an image file, and second link source information that is available outside a second linked area of the image file, the first linked area being associated with a first URI, and the second linked area being associated with a second URI;
a content obtaining unit, within the processor, for obtaining, from storing unit for storing content, first content specified by the first URI associated with the first linked area, and second content specified by the second URI associated with the second linked area;
a determination unit, within the processor, for determining correctness of association between the first linked area and the first URI based on the first link source information obtained by the information obtaining unit and the first content obtained by the content obtaining unit, and correctness of association between the second linked area and the second URI based on the second link source information obtained by the information obtaining unit and the second content obtained by the content obtaining unit;
an image obtaining unit, within the processor, for obtaining a first area image of an area outside the first linked area of the image file, a second area image of an area outside the second linked area of the image file;
wherein the first link source information includes recognizable characters visible in the first area image;
wherein the second link source information includes recognizable characters visible in the second area image;
a character recognition unit, within the processor, for recognizing the first link source information as characters from the first area image, and the second link source information as characters from the second area image; and
a coordinates obtaining unit, within the processor, for obtaining first coordinates of the first linked area within an image of the image file, the first linked area being a part of the image of the image file and specified by the first coordinates, and second coordinates of the second linked area within the image of the image file, the second linked area being a part of the image of the image file and specified by the second coordinates,
wherein the determination unit determines the correctness of the association between the first linked area and the first URI based on the characters of the first link source information recognized by the character recognition unit and the first content obtained by the content obtaining unit, and the correctness of the association between the second linked area and the second URI based on the characters of the second link source information recognized by the character recognition unit and the second content obtained by the content obtaining unit, and
wherein the image obtaining unit obtains the first area image from the image of the image file based on the first coordinates obtained by the coordinates obtaining unit, and the second area image from the image of the image file based on the second coordinates obtained by the coordinates obtaining unit,
wherein the determination unit determines the correctness of the associations based on whether the characters recognized by the character recognition unit are included in the content obtained by the content obtaining unit.

10. A determination device, including a processor, comprising:
an information obtaining unit, within the processor, for obtaining link source information that is available outside a linked area of an image file, the linked area being associated with an URI;
a content obtaining unit, within the processor, for obtaining, from storing unit for storing content, content specified by the URI associated with the linked area;
a determination unit, within the processor, for determining correctness of association between the linked area and the URI based on the link source information obtained by the information obtaining unit and the content obtained by the content obtaining unit;

an image obtaining unit, within the processor, for obtaining an area image of an area outside the linked area of the image file;

wherein the link source information includes recognizable characters visible in the area image;

a character recognition unit, within the processor, for recognizing the link source information as characters from the area image; and a coordinates obtaining unit, within the processor, for obtaining coordinates of the linked area within an image of the image file, the linked area being a part of the image of the image file and specified by the coordinates, wherein the determination unit determines the correctness of the association between the linked area and the URI based on the characters recognized by the character recognition unit and the content obtained by the content obtaining unit, and wherein the image obtaining unit obtains the area image from the image of the image file based on the coordinates obtained by the coordinates obtaining unit, wherein the determination unit determines the correctness of the association based on whether the content obtained by the content obtaining unit includes a predetermined ratio or more of a number of the characters recognized by the character recognition unit.

11. A determination method to be executed by a computer, comprising:

obtaining link source information that is available outside a linked area of an image file, the linked area being associated with an URI;

obtaining, from storing unit for storing content, content specified by the URI associated with the linked area;

determining correctness of association between the linked area and the URI based on the obtained link source information and the obtained content;

obtaining an area image of an area outside the linked area of the image file;

wherein the link source information includes recognizable characters visible in the area image;

recognizing the link source information as characters from the area image; and obtaining coordinates of the linked area within an image of the image file, the linked area being a part of the image of the image file and specified by the coordinates, wherein the correctness of the association between the linked area and the URI being determined based on the recognized characters and the obtained content, and wherein the area image being obtained from the image of the image file based on the obtained coordinates, wherein the determination of correctness of the association is based on whether the obtained content includes a predetermined ratio or more of a number of the recognized characters.

12. A non-transitory computer-readable storage medium having stored thereon a program for causing a computer to:

obtain link source information that is available outside a linked area of an image file, the linked area being associated with an URI;

obtain, from storing unit for storing content, content specified by the URI associated with the linked area;

determine correctness of association between the linked area and the URI based on the obtained link source information and the obtained content;

obtain an area image of an area outside the linked area of the image file;

wherein the link source information includes recognizable characters visible in the area image;

recognize the link source information as characters from the area image; and obtain coordinates of the linked area within an image of the image file, the linked area being a part of the image of the image file and specified by the coordinates, wherein the correctness of the association between the linked area and the URI being determined based on the recognized characters and the obtained content, and wherein the area image being obtained from the image of the image file based on the obtained coordinates, wherein the determination of correctness of the association is based on whether the obtained content includes a predetermined ratio or more of a number of the recognized characters.

13. A determination device, including a processor, comprising:

an information obtaining unit, within the processor, for obtaining first link source information that is available outside a first linked area of an image file, and second link source information that is available outside a second linked area of the image file, the first linked area being associated with a first URI, and the second linked area being associated with a second URI;

a content obtaining unit, within the processor, for obtaining, from storing unit for storing content, first content specified by the first URI associated with the first linked area, and second content specified by the second URI associated with the second linked area;

a determination unit, within the processor, for determining correctness of association between the first linked area and the first URI based on the first link source information obtained by the information obtaining unit and the first content obtained by the content obtaining unit, and correctness of association between the second linked area and the second URI based on the second link source information obtained by the information obtaining unit and the second content obtained by the content obtaining unit;

an image obtaining unit, within the processor, for obtaining a first area image of an area outside the first linked area of the image file, a second area image of an area outside the second linked area of the image file;

wherein the first link source information includes recognizable characters visible in the first area image;

wherein the second link source information includes recognizable characters visible in the second area image;

a character recognition unit, within the processor, for recognizing the first link source information as characters from the first area image, and the second link source information as characters from the second area image; and a coordinates obtaining unit, within the processor, for obtaining first coordinates of the first linked area within an image of the image file, the first linked area being a part of the image of the image file and specified by the first coordinates, and second coordinates of the second linked area within the image of the image file, the second linked area being a part of the image of the image file and specified by the second coordinates, wherein the determination unit determines the correctness of the association between the first linked area and the first URI based on the characters of the first link source information recognized by the character recognition unit and the first content obtained by the content obtaining unit, and the correctness of the association between the second linked area and the second URI based on the characters of the second link source information recognized by the character recognition unit and the second content obtained by the content obtaining unit, and wherein the image obtaining unit obtains the first area image from the image of the image file based on the first coordinates obtained by the coordinates obtaining unit, and the second area image from the image of the image file based on the second coordinates obtained by the coordinates obtaining unit, wherein the determinations of correctness of the association are based on whether the obtained content includes a predetermined ratio or more of a number of the recognized characters.

* * * * *